(12) United States Patent
Yamane et al.

(10) Patent No.: US 8,968,460 B2
(45) Date of Patent: Mar. 3, 2015

(54) COMPOSITE OXIDE BLACK PIGMENT AND METHOD FOR PRODUCING SAME

(71) Applicant: Dainichiseika Color & Chemicals Mfg. Co., Ltd., Tokyo (JP)

(72) Inventors: Kenichi Yamane, Tokyo (JP); Toru Kawakami, Tokyo (JP); Akira Nishio, Tokyo (JP); Hiroyoshi Terada, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 14/357,109

(22) PCT Filed: Dec. 18, 2012

(86) PCT No.: PCT/JP2012/082729
§ 371 (c)(1),
(2) Date: May 8, 2014

(87) PCT Pub. No.: WO2013/099690
PCT Pub. Date: Jul. 4, 2013

(65) Prior Publication Data
US 2014/0318416 A1   Oct. 30, 2014

(30) Foreign Application Priority Data

Dec. 26, 2011 (JP) ................. 2011-284450

(51) Int. Cl.
*C09C 1/24* (2006.01)
*C08K 3/10* (2006.01)

(52) U.S. Cl.
CPC ...................... *C09C 1/24* (2013.01)
USPC ........... 106/459; 106/401; 106/456; 106/480

(58) Field of Classification Search
CPC ........... C09C 1/24; C09C 1/0015; C08K 3/00
USPC .................. 106/401, 456, 459, 480
See application file for complete search history.

(56) References Cited

U.S. PATENT DOCUMENTS 6,350,307 B1 * 2/2002 Linke et al. ............ 106/496

FOREIGN PATENT DOCUMENTS

| JP | 2000-104005 | 4/2000 |
| JP | 2000-104006 | 4/2000 |
| JP | 3212065 B | 9/2001 |
| JP | 2002-020119 | 1/2002 |
| JP | 2002-309123 | 10/2002 |

* cited by examiner

*Primary Examiner* — Pegah Parvini
(74) *Attorney, Agent, or Firm* — Hamre, Schumann, Mueller & Larson, P.C.

(57) ABSTRACT

To provide a Cu—Mn—Fe-based complex inorganic oxide black pigment having a more vivid bluish hue than a Cu—Mn—Fe-based complex inorganic oxide black pigment obtained by a conventional wet method. A Cu—Mn—Fe-based complex inorganic oxide black pigment having a more vivid bluish hue is disclosed. The complex inorganic oxide black pigment has a spinel structure composed of oxides of copper, manganese and iron as main constituent metals, the molar ratio of copper/manganese/iron is in a range of 3 to 8/5 to 10/1, at least one divalent metal element other than the main constituent metals has been introduced, and the molar ratio of (copper+the divalent metal element)/(manganese+iron) is in a range of 1 to 1.6/2. A production process of the black pigment is also disclosed.

5 Claims, No Drawings

COMPOSITE OXIDE BLACK PIGMENT AND METHOD FOR PRODUCING SAME

TECHNICAL FIELD

This invention relates to a Cu—Mn—Fe complex inorganic oxide black pigment that has realized a more vivid bluish hue, and also to a production process thereof. The present invention is concerned with a technology that provides a complex inorganic oxide black pigment, which is more bluish than conventional similar pigments and is excellent in tinting power, vividness, dispersibility and color developability. More specifically, the present invention pertains to a complex inorganic oxide black pigment, which has a still more bluish hue and is usable in a wide variety of applications.

BACKGROUND ART

Conventionally, a black pigment has been preferred to be bluish rather than reddish in hue, and in recent years, there is an increasing marketability for those capable of realizing a more vivid tone in a wide range of fields, leading to a strong desire for a black pigment that can realize a more vivid bluish hue. Under such circumstances, complex inorganic oxide black pigments are widely known over years as inorganic pigments excellent in heat resistance, flooding resistance, fastness and the like, and are extensively used as colorants in general paints led by heat-resistant paints and also as coloring materials for ceramics. The above-described complex inorganic oxide black pigments include Cu—Cr-based, Cu—Cr—Mn-based, Cu—Mn-based, Cu—Mn—Fe-based, Co—Cr—Fe-based, and like ones, and have a spinel structure in general. Their production processes can be roughly divided into two groups, one including dry processes that the oxides, carbonates or the like of individual constituent metals are mixed and baked and the resulting baked product is ground, and the other wet processes that soluble salts of individual constituent metals are dissolved into a solution of mixed salts, these salts are precipitated with an alkali or the like to obtain a precursor, and the precursor is baked.

In the production of a complex inorganic oxide black pigment, it is extremely difficult and in fact, impossible to obtain a pigment of small primary particles by a dry method. From such a background, the present applicant, together with its affiliated company, already conducted research in an attempt to obtain a pigment of small primary particles, and to date, have proposed black pigments produced by a wet method and having excellent tinting power, vividness and color developability and a production process thereof (Patent Document 1). However, the black pigments proposed in Patent Document 1 are hardly considered to be sufficient in the degree of bluishness to meet the high performance desired for the hue of a black pigment in recent years. Accordingly, the present applicant, together with its affiliated company, has made a further proposal on a production process of a black pigment, which optimizes the composition of the black pigment to provide it with a more bluish hue (Patent Document 2).

PRIOR ART DOCUMENTS

Patent Documents

Patent Document 1: JP-B-3212065
Patent Document 2: JP-A-2002-309123

DISCLOSURE OF THE INVENTION

Problem to be Solved by the Invention

Nonetheless, even with the technology described in the above-described Patent Document 2 the object of which is to provide a black pigment having a more bluish hue, its effects are limitative, and therefore, this technology is still hardly considered to be sufficient for high desires in recent years from various industry segments where a black pigment that has realized a more vivid bluish hue has long been awaited. On the other hand, as has been observed in regard to color filters, inkjet printing inks, toner inks and the like in recent years, there is also a keen demand for a pigment of small particles with respect to a black pigment like pigments of other colors as a reflection of the developments in thin-film formation and microdispersion technologies. However, with a dry process that subsequent to mixing and baking of oxides of main constituents, grinds the baked product, a pigment of such small particles can be hardly obtained as mentioned above, and moreover, the resulting black pigment is weak in color tone and very inferior in tinting power. Pigments produced by such dry processes cannot, therefore, meet the various high demands in the above-described recent applications.

In the above-cited patent documents on the black pigments proposed to date by the present applicant together with its affiliated company, synthesis processes of a Cu—Mn oxide and Cu—Mn—Fe oxide by a wet method are described, respectively. The color tones of the black pigments obtained by these processes have a significantly bluish hue compared with the black pigments obtained by other production processes, and are equipped with a certain value of utility. Even with these technologies, however, the high-level desires from the various industry segments in recent years cannot be sufficiently met as mentioned above, leading to an outstanding eager desire for the development of a black pigment that has realized a more vivid bluish hue.

Therefore, the present invention is an improvement invention on the above-described black pigments proposed to date by the present applicant together with its affiliated company. An object of the present invention is to make improvements in the conventional technologies and to provide a technology that can provide a Cu—Mn—Fe-based complex inorganic oxide black pigment having a more vivid bluish hue than the conventional pigments, said hue being not to have been realized with the black pigments provided by the conventional technologies, and that can also sufficiently meet the variety of high-level desires from the various industry segments in recent years.

Means for Solving the Problem

The above-described object can be achieved by the below-described present invention. Described specifically, the present invention provides a Cu—Mn—Fe-based complex inorganic oxide black pigment having a more vivid bluish hue, wherein the complex inorganic oxide black pigment has a spinel structure comprising oxides of copper, manganese and iron as main constituent metals, a molar ratio of copper/manganese/iron is in a range of 3 to 8/5 to 10/1, at least one divalent metal element other than the main constituent metals has been introduced, and a molar ratio of (copper the divalent metal element)/(manganese+iron) is in a range of 1 to 1.6/2.

As preferred embodiments of the bluish complex inorganic oxide black pigment according to the present invention, the following complex inorganic oxide black pigments can be mentioned:

The above-described complex inorganic oxide black pigment, wherein the dissimilar divalent is at least one of Mg or Ca.

The above-described complex inorganic oxide black pigment, wherein a molar ratio of copper/the dissimilar divalent metal, which is a ratio of a molar amount of copper among the main constituent metals to a total molar amount of the dissimilar divalent metal other than the main constituent metals, is 5 to 100/1.

The present invention also provides a production process of any one of the above-described complex inorganic oxide black pigments, which comprises dissolving, in water, salts of all metals constituting the pigment and consisting of copper, manganese and iron as main constituent metals and a divalent metal element, which is other than the main constituent metals and is to be introduced along with the main constituent metals, to prepare a mixed solution; adding an aqueous solution of an alkali as a precipitant in excess to the mixed solution to form a coprecipitate; concurrently with or after settling out of the coprecipitate, subjecting the coprecipitate to oxidation treatment in a liquid phase to form a precursor of pigment particles; and after water washing, filtration and drying of the precursor, baking the thus-dried precursor such that the divalent metal element other than the main constituent metals is introduced in a complex inorganic oxide black pigment comprising copper, manganese and iron as main constituent metals. As a preferred embodiment of the production process according to the present invention, a solution upon formation of the coprecipitate has a pH of 9 or higher.

Advantageous Effects of the Invention

According to the present invention, there are provided, as described above, a complex inorganic oxide black pigment, which is still more bluish in hue than similar pigments provided by the conventional technologies, is excellent in tinting power, vividness and the like, and exhibits insulating properties, and also a production process of the complex inorganic oxide black pigment. The black pigment according to the present invention has a still stronger bluish hue owing to its more pronounced bluishness, and moreover, can be used, owing to its microparticulation, as an excellent colorant for general paints and building materials, an outstanding colorant for automotive paints and synthetic resins, and a superb coloring material for ceramics. Not being limited to these applications, it can also be used in new applications developed in recent years. Described specifically, making use of the characteristics of the complex inorganic oxide black pigment provided by the present invention that it is an extremely finely divided pigment with a still stronger bluish hue, it is useful, for example, as a black pigment for black matrices in CRTs (cathode ray tubes), PDPs (plasma displays), LCDs (liquid crystal displays) and the like, a black pigment for color filters and neutral gray filters, which reduce outside light reflection, in PDPs and LCDs, a black pigment for inkjet printing inks, a black pigment for toners, and a bluing black pigment for carbon black; and in addition, as a black pigment for color clear paints and plastic paints.

MODES FOR CARRYING OUT THE INVENTION

Based on preferred embodiments, the present invention will next be described in further detail.

As a result of enthusiastic research in an attempt to achieve the above-mentioned object, the present inventors found that a complex inorganic oxide black pigment having a more vivid bluish hue can be obtained by using a Cu—Mn—Fe-based complex inorganic oxide black pigment known to show bluishness among complex inorganic oxide black pigments and further, introducing in a spinel structure thereof a dissimilar divalent metal, which is other than the main constituent metals of Cu, Mn and Fe, in a specific range, for example, by a method such as that to be described below. The above-described finding has led to the completion of the present invention. According to a study by the present inventors, it has been found that the pigment can be provided with excellent characteristics by adding, as a precipitating agent, an aqueous solution of an alkali to salts of the individual metals of copper, the dissimilar divalent metal, manganese and iron, which make up the complex inorganic oxide black pigment having the more vivid bluish hue, to have the hydroxides of these metals precipitated together as a coprecipitate, and concurrently with or after the precipitation, subjecting the coprecipitate to oxidation treatment in a liquid phase. According to the above-described process, upon baking that is to be conducted after the oxidation treatment, the baking temperature can be set extremely low, and as a consequence, the resulting pigment is obtained as a Cu—Mn—Fe-based complex inorganic oxide black pigment which is in a fine particulate form, is excellent in tinting power, and has a very vivid bluish hue. Moreover, the black pigment provided by the present invention is soft despite its fine particulate form, is excellent in dispersibility, and is also superb in that it does not contain any highly harmful element such as Cr.

It came to the present inventors' mind that the below-described contrivances would be effective upon synthesis of the Cu—Mn—Fe oxide-based black pigment, which is known to show a bluish hue among the above-described black pigments, by a wet precipitation process. Based on this idea, the present inventors conducted a study, leading to the formation of the complex inorganic oxide black pigment according to the present invention. As mentioned above, the wet precipitation process includes dissolving soluble salts of the individual constituent metals into a mixed solution, having a precursor neutralized and precipitated with an alkaline agent in an aqueous medium, subjecting the resulting precipitate to oxidation treatment in a liquid phase concurrently with or after the precipitation, and conducting baking such that during the baking, a spinel structure is formed through a solid state reaction to synthesize a pigment. The present inventors then thought that a complex inorganic oxide black pigment having a still stronger bluish hue would be obtainable if it would be possible to positively prevent trivalent ions from penetrating to four-coordinated sites (hereinafter referred to as "A sites") in the spinel structure upon formation of the spinel structure through the solid state reaction during the baking. Based on that thinking, the present inventors conducted a further study. As a result, the present inventors found that in the above-described wet precipitation process, it is effective to set Cu in excess of its stoichiometric amount among the main component metals of the Cu—Mn—Fe oxide-based pigment and further to add a dissimilar divalent metal for selective coordination to the A sites in the spinel structure, leading to the completion of the present invention. By contriving as described above, it is, therefore, possible to prevent trivalent ions from penetrating to the A sites of the spinel structure and to provide a black pigment having a more vivid bluish hue, the provision of which is the object of the present invention. A description will hereinafter be made about the constituent materials (constituents) of the complex inorganic oxide black pigment according to the present invention.

To obtain the above-described pronounced effects of the present invention, the complex inorganic oxide black pigment according to the present invention needs, in addition to its main constituent metals, a divalent metal element (hereinafter called "the dissimilar metal") other than the main constituent metals. Any metal element is usable as the dissimilar metal insofar as it becomes divalent in the pigment and does not inhibit the production of a color to be achieved by the main constituent metals. From the object of the present invention, however, an element needs to be selected depending on the vividness of bluishness to be achieved by the introduction of the dissimilar metal. As a result of a study conducted from such a viewpoint, the dissimilar metal to be introduced has been found to be preferably Mg, Ca or the like in that more vivid bluishness is shown. According to a study by the present inventors, the use of Mg among these dissimilar metals is particularly suited. These elements can be used not only singly but also as a combination of two or more thereof. About the main constituent metals, a description will be made subsequently herein.

To obtain a black pigment capable of realizing a more vivid bluish hue as intended by the present invention, the molar ratio of the main constituent metals as calculated from the amounts of the individual metals to be introduced first needs to be set in the range specified by the present invention. The black pigment according to the present invention can be easily obtained by the above-described production process of the present invention. Upon obtaining the black pigment, the molar ratio of the main constituent metals as calculated from the amounts of the individual metals to be introduced is set in a specific range, and further, the molar ratio of the dissimilar metal, which is to be used in combination with the main constituent metals, to the main constituent metals is set in an optimal range.

In the complex inorganic oxide black pigment according to the present invention, the copper/manganese/iron molar ratio of the main constituent metals of copper, manganese and iron is first set to fall within the range of 3 to 8/5 to 10/1. In the present invention, it is also required to set such that the relation between Cu, Mn and Fe as main constituent metals and the introduced dissimilar divalent metal, especially the relation between Cu among the main constituent metals and the introduced dissimilar divalent metal satisfies the below-described requirement. Specifically, the molar ratio of (the molar amount of copper+the total molar amount of the dissimilar metal)/(the molar amount of manganese+the molar amount of iron) is set to fall within the range of 1 to 1.6/2. In particular, it is preferred to introduce the dissimilar divalent metal in the spinel structure of Cu—Mn—Fe such that the molar ratio of (the molar amount of copper)/(the total molar amount of the dissimilar divalent metal) falls within the range of 5 to 100/1.

According to a study by the present inventors, the adoption of such setting as described above can realize a black pigment having a vivid bluish hue that has been unavailable with the Cu—Mn—Fe oxide-based black pigments known to date. Especially, bluishness tends to become insufficient if copper and the dissimilar divalent metal are too little. Even if they are added excessively, on the other hand, no substantial change is observed in hue and no extra effect can be expected, and moreover, a reduction is induced in the density of a color to be produced. It is, therefore, not preferred to add them too little or too much. According to a study by the present inventors, it was found that the quantitative balance between manganese and iron as main constituent metals has a bearing on the density and hue of a color to be produced with the resulting complex inorganic oxide black pigment. In the complex inorganic oxide black pigment according to the present invention, the ratio of the molar amount of manganese to the molar ratio of iron as its main constituent metals is specified to be at 5 to 10/1. Described specifically, the hue becomes yellowish when iron is greater than the above-described range, but the tinting power becomes lower when iron is less than the above-described range.

As a result of a more detailed study, the present inventors confirmed that outside the range of 3 to 8/5 to 10/1 as the molar ratio of copper/manganese/iron as main constituent metals, the introduction of the dissimilar metal is not sufficiently effective for the object of the present invention and cannot obtain a vivid bluish hue. Accordingly, the setting of the molar ratio of the main constituent metals within the above-described range has been determined to be an essential requirement for the complex inorganic oxide black pigment according to the present invention. With the foregoing essential requirement in mind, a further study was made on a relation in molar ratio between the main constituent metals and the dissimilar metal. As a result, it was found effective for the achievement of the object of the present invention to introduce the dissimilar divalent metal such that the molar ratio of (copper+the divalent metal)/(manganese+iron) falls within the range of 1 to 1.6/2. This finding has led to the present invention. According to a still further study by the present inventors, it is more preferred for the achievement of the object of the present invention to introduce the dissimilar divalent metal into the spinel structure of Cu—Mn—Fe such that in addition to the above-described requirement, the molar ratio of (the molar amount of copper)/(the total molar amount of the dissimilar divalent metal) falls within the range of 5 to 100/1.

According to a yet further study by the present inventors, the black pigment is provided with an even still stronger bluish hue when the molar ratio of copper/manganese/iron as main constituent metals falls within a range of 3.5 to 6.5/6 to 9.5/1 and the molar ratio of (the molar amount of copper)/(the total molar amount of the dissimilar divalent metal) is 10 to 20/1. These ranges are more preferred accordingly.

A description will hereinafter be made about the process for the production of the black pigment of the above-described characteristics according to the present invention. The production process of the black pigment according to the present invention comprises dissolving, in water, salts of all metals constituting the pigment and consisting of copper, manganese and iron as main constituent metals and a divalent metal element, which is other than the main constituent metals and is to be introduced along with the main constituent metals, to prepare a mixed solution; adding an aqueous solution of an alkali as a precipitant in excess to the mixed solution to form a coprecipitate; concurrently with or after settling out of the coprecipitate, subjecting the coprecipitate to oxidation treatment in a liquid phase to form a precursor of pigment particles; and after water washing, filtration and drying of the precursor, baking the thus-dried precursor such that the divalent metal element other than the main constituent metals is introduced in a complex inorganic oxide black pigment comprising copper, manganese and iron as main constituent metals. Examples of the salts of the constituent metal elements which make up the black pigment in the production process include the sulfates, nitrates, chlorides, acetates and the like of copper, the dissimilar metal, manganese and iron. It is, however, to be noted that the salts used in the production of the conventional complex inorganic oxide black pigments are all usable and no particular limitations are imposed on the salts of the constituent metal elements.

In the process of the present invention for the production of the black pigment, such salts of the individual constituent metal elements as described above are first dissolved to form an aqueous solution of the mixed salts. Upon formation of the aqueous solution, the concentrations of the metal salts may preferably be set such that the individual metals are contained at such molar ratios as described above, and in addition, the metal salts are contained as a whole at a concentration of approx. 5 to 50 mass, or so. Along and concurrently with an aqueous solution of an alkali as a precipitant such as caustic soda, the solution of the mixed salts, which has been prepared as described above, is added dropwise to a precipitation medium provided beforehand. The total concentration of the reactants after the dropwise addition as calculated in terms of the metal salts may be set as desired unless it is of such a level as exerting a significant deleterious effect on the resulting precipitation product (coprecipitate). In view of the workability and the subsequent steps, however, it is preferred to set the total concentration at 0.05 to 0.2 mole/liter. A total concentration of lower than 0.05 mole/liter is not preferred in that the resulting dried product is very hard and its yield is low. On the other hand, a total concentration of higher than 0.2 mole/liter is not preferred either in that the synthesized product is non-homogeneous.

The above-described synthesis (coprecipitation) of the pigment can sufficiently exhibit its effects provided that its temperature falls within a temperature range in which the synthesis of conventional similar pigments is generally carried out by a wet method, specifically in a range of 0 to 100° C. When the synthesis temperature becomes high, however, the resulting particles grow fast to have large particle sizes. The pigment so obtained tends to be impaired in tinting power, and at the same time, strongly aggregates so that its dispersibility may be adversely affected. It is, therefore, preferred to control the synthesis temperature at 30° C. or lower.

In the process of the present invention for the production of the black pigment, the aqueous solution of the alkali as the precipitant is added in excess to the solution of the mixed salts that the salts of the metals as the constituents are dissolved in water, whereby a coprecipitate is formed. Described specifically, it is important to control the pH of the solution at 9 or higher, preferably on an alkaline side of pH 10 or higher during the synthesis (coprecipitation) of the pigment. At a low pH, pigment particles become large and basic salts are formed partially. Therefore, such a low pH is not suited for the production of fine particles, and tends to provide the resulting pigment with impaired tinting power. Further, pigment particles become small when the pH value is high during the synthesis (coprecipitation) of the pigment. Accordingly, the pH during the synthesis of the pigment is adjusted according to the intended use or application. To obtain fine particles as intended in the present invention, the pH during the synthesis of the pigment may be more preferably 11 to 13. An alkaline side pH higher than the above-described range is not a very preferred condition, because the resulting dried product becomes very hard. In the production process according to the present invention, the excess alkali is added after the formation of the coprecipitate. Upon addition of the excess alkali, the excess quantity may be in a range of 1.1 to 1.5 times, desirably around 1.1 times the molar number of the alkali required for the coprecipitation, because such an excess quantity is most preferred for the characteristics of the pigment. After forming a coprecipitate under stirring for 30 minutes to 1 hour as described above, aging is conducted for 5 to 20 minutes or so to complete the coprecipitation reaction.

In the production process according to the present invention, concurrently with or after the settling-out of the coprecipitate formed as described above, the coprecipitate is next subjected to oxidation treatment. As a reason for conducting this oxidation treatment, iron and manganese among the main constituent metals to be coordinated as trivalent ions at eight-coordinated sites (B sites) also exist as divalent ions so that the oxidation treatment is needed to convert Fe and Mn fully to trivalent metal ions. The oxidation treatment of the coprecipitate may be conducted in the coprecipitation system concurrently with the formation of the coprecipitate, or after completion of the coprecipitation reaction, in the coprecipitation system or in another liquid phase. Irrespective of when and where the oxidation treatment is conducted, the coprecipitate can be subjected to aging after completion of the oxidation. As examples of an oxidizing agent for use in this oxidation treatment, conventionally-known oxidizing agents such as hydrogen peroxide, air (oxygen), sodium chlorinate and ammonium persulfate are all usable. Of these, preferred oxidizing agents are those which do not form impurities by oxidation, for example, hydrogen peroxide and air (oxygen). For the reason described above, it is necessary to use the oxidizing agent in an amount sufficient to oxidize divalent metal ions of Fe and Mn to trivalent metal ions.

In the production process according to the present invention, the thus-obtained coprecipitate (product) is then washed with water and collected by filtration. After drying the product collected by the filtration, the dried product was baked. No particular limitation is imposed on the temperature at which such a collected product is to be dried, but drying at a temperature of 100 to 120° C. or so is preferred. No particular limitation is imposed either on conditions under which such a resultant dried product is to be baked. However, the complex inorganic oxide black pigment according to the present invention can be stably obtained by baking such a resultant dried product in an oxidizing atmosphere at a temperature of 400 to 700° C., preferably 550 to 600° C. for 30 minutes to 1 hour. The complex inorganic oxide black pigment according to the present invention obtained as described above exhibits the characteristics that, compared with the above-described black pigments proposed to date by the present applicant together with its affiliated company and the conventional black pigments of the same composition obtained by dry processes, its hue is very bluish and its tinting power is excellent. In addition, the black pigment of the present invention as produced by the above-described process is provided with a BET specific surface area of 20 to 100 $m^2/g$ as measured by "NOVA-2000" (manufactured by Quantachrome Instruments), and is a high-dispersibility, Cu—Mn—Fe-based complex inorganic oxide black pigment. The above-described pigment obtained by the production process of the present invention was examined by powder X-ray diffractometry, and as a result, was confirmed to be a single composition of the spinel structure, which contained no dissimilar phase. Further, the introduction of the dissimilar divalent metal in the pigment was also confirmed by a fluorescent X-ray analysis.

EXAMPLES

Based on examples and comparative examples, the present invention will next be described more specifically. It is to be noted that all designations of "parts" and "%" in the following description are on a mass basis unless otherwise specifically indicated.

Example 1

Copper sulfate pentahydrate (138 parts), manganese sulfate monohydrate (150 parts) and ferrous sulfate heptahydrate (27 parts) were weighed separately. To these salts, water was added to completely dissolve them to 1,000 parts in total, whereby an aqueous solution of the mixed salts was prepared.

Caustic soda (130 parts) was then weighed as a precipitant, to which water was added to completely dissolve it to 800 parts in total, whereby an aqueous solution of caustic soda was prepared. A solution had been provided beforehand by adding calcium chloride dehydrate (2 parts) and magnesium chloride hexahydrate (5 parts) to water (1,800 parts) as a precipitation medium to completely dissolve them and controlling the temperature of the resulting solution to approx. 20° C. To this solution, the aqueous solution of the mixed salts and the aqueous solution of caustic soda, both of which had been prepared before, were concurrently added dropwise, and a coprecipitation reaction was allowed to complete in approx. 30 minutes to 1 hour. During the reaction, the pH was controlled to remain within a range of 11.5 to 12.0. After completion of the dropwise addition of the aqueous solution of the mixed salts, the dropwise addition of the aqueous solution of excess caustic soda was continued as it was, and subsequent to the completion of the dropwise addition, a solution of hydrogen peroxide (concentration: 35%) (60 parts) in water (120 parts) was added dropwise while maintaining the pH, whereby oxidation treatment was conducted.

After completion of the above-described oxidation treatment, the temperature of the resulting liquid mixture was raised to 80° C., at which aging was conducted for 1 hour or so. The thus-obtained product, which was a precursor of pigment particles, was thoroughly washed with water to wash away any remaining salts, followed by filtration. The product collected by the filtration was then dried at a temperature of 100 to 120° C. for 12 hours or longer. The resulting dried product was baked at 580° C. for 1 hour in an oxidizing atmosphere, and was then cooled. By grinding the thus-baked product, a complex inorganic oxide black pigment was obtained with a BET specific surface area of 41 $m^2/g$ and a vivid bluish hue. In the thus-obtained pigment, the molar ratio of copper/manganese/iron was 5.7/9.1/1, and calcium and magnesium had been introduced as dissimilar divalent metals. The molar ratio of copper/(calcium+magnesium) was 14.5/1. Further, the molar ratio of (copper+the divalent metal elements)/(manganese+iron) was 1.21/2.0.

The complex inorganic oxide black pigment obtained as described above was thoroughly dispersed in an acrylic resin (amount of the pigment: 3 PHR) by a paint conditioner (manufactured by Red Devil, Inc.). The resulting pigment dispersion was spread over a transparent PET film by a 6 mil applicator, and the hue of transmitted light was observed (measurement instrument: "COLORCOM SYSTEM" manufactured by Dainichiseika Color & Chemicals Co, Ltd.). In addition, one extended with titanium oxide was also observed for the hue of reflected light and tinting power. As a result, the complex inorganic oxide black pigment of this example was found to be excellent in vividness, high in tinting power, very bluish and vivid in hue, and also good in dispersibility. The results are shown in Table 1. It is to be noted that the above-described "PHR" is an abbreviation of per hundred resin, and means a mass ratio of the pigment when the acrylic resin is assumed to be 100.

Comparative Example 1

Copper sulfate pentahydrate (120 parts), manganese sulfate monohydrate (130 parts) and ferrous sulfate heptahydrate (56 parts) were weighed separately. To these salts, water was added to completely dissolve them to 1,000 parts in total, whereby an aqueous solution of the mixed salts was prepared. Caustic soda (130 parts) was then weighed as a precipitant, to which water was added to completely dissolve it to 800 parts in total, whereby an aqueous solution of caustic soda was prepared. In a similar manner as conducted in Example 1 except that water (1,400 parts) controlled at approx. 22° C. was provided beforehand as a precipitation medium, a complex inorganic oxide black pigment of Comparative Example 1, in which no dissimilar metal had been introduced, was obtained. The resulting complex inorganic oxide black pigment was observed as in Example 1. The complex inorganic oxide black pigment was high in tinting power, excellent in vividness, and also good in dispersibility, but was strongly yellowish in hue. The results are shown in Table 1. In the pigment so obtained, the BET specific surface area was 39 $m^2/g$ and the molar ratio of copper/manganese/iron was 2.4/3.8/1, both of which were outside the corresponding ranges specified in the present invention.

Comparative Example 2

In a similar manner as conducted in Comparative Example 1 except that one prepared by placing calcium chloride dehydrate (2 parts) and magnesium chloride hexahydrate (5 parts) in water (1,800 parts) as a precipitation medium, completely dissolving them to form an aqueous solution of the mixed salts and adjusting the temperature of the aqueous solution of the mixed salts to approx. 20° C. was provided beforehand, and to the temperature-adjusted aqueous solution, a similar aqueous solution of mixed sulfate salts and a similar aqueous solution of caustic soda as those used in Comparative Example 1 were concurrently added dropwise, a complex inorganic oxide black pigment of Comparative Example 2 was obtained. The resulting complex inorganic oxide black pigment was observed as in Example 1. The complex inorganic oxide black pigment was high in tinting power, excellent in vividness, and also good in dispersibility, but was yellowish in hue. Compared with the complex inorganic oxide black pigment of Comparative Example 1, however, the complex inorganic oxide black pigment of Comparative Example 2 was confirmed to be reduced in yellowishness. In the pigment so obtained, the BET specific surface area was 41 $m^2/g$, the dissimilar metals had been introduced, and the molar ratio of copper/(calcium+magnesium) was 12.6/1. However, the molar ratio of copper/manganese/iron as main constituent metals was 2.4/3.8/1 as in the pigment of Comparative Example 1, and was outside the corresponding range specified in the present invention.

Comparative Example 3

Copper sulfate pentahydrate (138 parts), manganese sulfate monohydrate (150 parts) and ferrous sulfate heptahydrate (27 parts) were weighed separately. To these salts, water was added to completely dissolve them to 1,000 parts in total, whereby an aqueous solution of the mixed salts was prepared. Caustic soda (130 parts) was then weighed as a precipitant, to which water was added to completely dissolve it to 800 parts in total, whereby an aqueous solution of caustic soda was prepared. In a similar manner as conducted in Example 1 except that water (1,400 parts) controlled at approx. 22° C. was provided beforehand as a precipitation medium, a complex inorganic oxide black pigment of Comparative Example 3 was obtained with a BET specific surface area of 41 $m^2/g$. The thus-obtained pigment had a similar molar ratio of copper/manganese/iron as main constituent metals as in the pigment of Example 1, but no dissimilar metal had been introduced therein. The complex inorganic oxide black pigment so obtained was observed as in Example 1. The complex inorganic oxide black pigment was high in tinting power, excellent in vividness, and also good in dispersibility, but was a little yellowish in hue. The results are shown in Table 1.

TABLE 1

Evaluation Results

| | | | Hue of transmitted light | | | Hue of Reflected light | | |
|---|---|---|---|---|---|---|---|---|
| | Evaluation of hue | Dispersibility | L* | a* | b* | L* | a* | b* |
| Ex. 1 | Vivid bluish | Good | 24.85 | −1.62 | −12.88 | 44.75 | −1.91 | −10.27 |
| Comp. Ex. 1 | Strongly yellowish | Good | 24.63 | −1.75 | −6.61 | 44.90 | −1.88 | −8.10 |
| Comp. Ex. 2 | Yellowish | Good | 24.70 | −1.56 | −7.87 | 44.53 | −1.72 | −8.51 |
| Comp. Ex. 3 | A little yellowish | Good | 24.75 | −1.52 | −10.02 | 44.68 | −1.76 | −8.85 |

In an evaluation of pigment characteristics, the pigments of Example 1 and Comparative Examples 1 to 3 were all good in vividness and tinting power, but as shown in Table 1, the pigments of Comparative Examples 1 to 3 were all yellowish to varying extents and were clearly different in hue from the pigment of Example 1 which showed vivid bluishness.

Examples 2 to 7 & Comparative Examples 4 to 8

By a similar production process as that described in Example 1, complex inorganic oxide black pigments of these examples and comparative examples were produced such that in each pigment so obtained, the molar ratio of copper/manganese/iron as its main constituent metals, the kind (s) of introduced dissimilar divalent metal (s), and the molar ratio of the total amount of the dissimilar metal (s) to copper were set as shown in Table 2. The complex inorganic oxide black pigments so obtained were observed as in Example 1. The pigments of these examples and comparative examples were all high in tinting power, excellent in vividness, and also good in dispersibility. In hues, however, the pigments of Examples 2 to 7 and those of Comparative Examples 4 to 8 were clearly different from each other, and the pigments of Examples 2 to 7 were each confirmed to show a good hue as intended in the present invention. Taking the pigment of Example 1 as a reference, the hues of the respective pigments were subjected to relative evaluation according to the below-described standards. The results are shown in Table 2.

The relative evaluation of the hues as shown in Table 2 was performed according to the following standards.

A: Vivid bluishness of the same degree as the reference pigment was presented.
B: Vivid, but yellowishness was presented slightly compared with the reference pigment.
C: Yellowishness was presented a little compared with the reference pigment.
D: Yellowishness was presented strongly compared with the reference pigment.

TABLE 2

Molar Ratios of Main Constituent Metals and Kinds and Molar Ratios of Dissimilar Divalent Metals in Pigments, and Evaluation Results of Hues

| | Evaluation of hue | Molar ratio (Cu/Mn/Fe) | Cu/dissimilar metal(s) (molar ratio) | | Cu + dissimilar metal(s)/Mn + Fe (molar ratio) |
|---|---|---|---|---|---|
| | | | Dissimilar metal(s) | Molar ratio | |
| Ex. 2 | A | 5.1/9.2/1.0 | Mg | 15.2/1.0 | 1.07/2.0 |
| Ex. 3 | A | 5.1/9.2/1.0 | Ca | 15.2/1.0 | 1.07/2.0 |
| Ex. 4 | A | 3.8/6.0/1.0 | Mg + Ca | 15.1/1.0 | 1.16/2.0 |
| Ex. 5 | A | 4.0/6.0/1.0 | Mg + Ca | 10.5/1.0 | 1.25/2.0 |
| Ex. 6 | B | 8.0/10.0/1.0 | Mg + Ca | 15.3/1.0 | 1.55/2.0 |
| Ex. 7 | B | 8.0/10.0/1.0 | Mg + Ca | 20.0/1.0 | 1.53/2.0 |
| Comp. Ex. 4 | D | 2.4/6.0/1.0 | Mg + Ca | 10.5/1.0 | 0.75/2.0 |
| Comp. Ex. 5 | D | 7.0/6.0/1.0 | Mg + Ca | 10.5/1.0 | 2.19/2.0 |
| Comp. Ex. 6 | D | 7.5/15.0/1.0 | Mg + Ca | 19.5/1.0 | 0.99/2.0 |
| Comp. Ex. 7 | D | 12.1/15.0/1.0 | Mg + Ca | 19.5/1.0 | 1.59/2.0 |
| Comp. Ex. 8 | D | 3.8/4.0/1.0 | Mg + Ca | 19.5/1.0 | 1.59/2.0 |

INDUSTRIAL APPLICABILITY

Owing to the provision of the complex inorganic oxide black pigment showing the characteristics that compared with the conventional black pigments proposed to date by the present applicant together with its affiliated company, it is excellent in tinting power, vividness and the like, and moreover, is fine particulate and has a still more bluish hue, the complex inorganic oxide black pigment according to the present invention is expected to find a wide range of utility as application examples of the present invention. Described specifically, the utility of the complex inorganic oxide black pigment according to the present invention is not limited to a colorant for general paints, automotive paints, building materials and synthetic resins and a coloring material for ceramics. The excellent characteristics of the complex inorganic oxide black pigment according to the present invention can fully meet the desires from various industry segments in recent years, and therefore, the complex inorganic oxide black pigment according to the present invention is also useful as a black pigment for black matrices of color filters, a black pigment for color filters and neutral gray filters, which reduce outside light reflection, in PDPs and LCDs, a black pigment for inkjet printing inks, a black pigment for toners, and a bluing black pigment for carbon black; and in addition, as a black pigment for color clear paints and plastic paints. The complex inorganic oxide black pigment according to the present invention is, therefore, expected to find utility in such a wide range of fields.

The invention claimed is:

1. A Cu—Mn—Fe-based complex inorganic oxide black pigment having a more vivid bluish hue, wherein the complex inorganic oxide black pigment has a spinel structure comprising oxides of copper, manganese and iron as main constituent metals, a molar ratio of copper/manganese/iron is in a range of 3 to 8/5 to 10/1, at least one divalent metal element other than the main constituent metals has been introduced, and a molar ratio of (copper+the divalent metal element)/(manganese+iron) is in a range of 1 to 1.6/2.

2. The complex inorganic oxide black pigment according to claim 1, wherein the divalent metal element other than the main constituent metals is at least one of Mg or Ca.

3. The complex inorganic oxide black pigment according to claim 1, wherein a molar ratio of copper/the divalent metal element, which is a ratio of a molar amount of copper among the main constituent metals to a total molar amount the divalent metal element other than the main constituent metals, is 5 to 100/1.

4. A production process of a complex inorganic oxide black pigment according to claim 1, which comprises dissolving, in water, salts of all metals constituting the pigment and consisting of copper, manganese and iron as main constituent metals and a divalent metal element, which is other than the main constituent metals and is to be introduced along with the main constituent metals, to prepare a mixed solution; adding an aqueous solution of an alkali as a precipitant in excess to the mixed solution to form a coprecipitate; concurrently with or after settling out of the coprecipitate, subjecting the coprecipitate to oxidation treatment in a liquid phase to form a precursor of pigment particles; and after water washing, filtration and drying of the precursor, baking the thus-dried precursor such that the divalent metal element other than the main constituent metals is introduced in a complex inorganic oxide black pigment comprising copper, manganese and iron as the main constituent metals.

5. The production process according to claim 4, wherein upon formation of the coprecipitate, a solution has a pH of 9 or higher.

* * * * *